(12) United States Patent
Zhang et al.

(10) Patent No.: US 9,947,353 B1
(45) Date of Patent: Apr. 17, 2018

(54) MAGNETIC RECORDING SYSTEM EMPLOYING PASSIVE THERMAL ASPERITY AVOIDANCE

(71) Applicant: Seagate Technology LLC, Cupertino, CA (US)

(72) Inventors: Lihong Zhang, Singapore (SG); Xiong Liu, Singapore (SG); Swee Chuan Gan, Singapore (SG); Guo Qing Zhang, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/659,828

(22) Filed: Jul. 26, 2017

(51) Int. Cl.
G11B 5/09 (2006.01)
G11B 5/55 (2006.01)
G11B 5/00 (2006.01)

(52) U.S. Cl.
CPC .......... G11B 5/5565 (2013.01); G11B 5/5552 (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,659,677 A * | 8/1997 | Cohn | G06F 11/1076 711/114 |
| 5,751,510 A * | 5/1998 | Smith | G11B 5/02 338/32 R |
| 5,942,680 A | 8/1999 | Boutaghou | |
| 6,178,053 B1 | 1/2001 | Narita | |
| 6,216,242 B1 | 4/2001 | Schaenzer | |
| 6,243,350 B1 | 6/2001 | Knight et al. | |
| 6,275,029 B1 | 8/2001 | Schaff | |
| 6,452,735 B1 * | 9/2002 | Egan | G11B 21/21 360/25 |
| 6,567,229 B1 | 5/2003 | Mallary et al. | |
| 6,754,015 B2 | 6/2004 | Erden et al. | |
| 6,940,669 B2 | 9/2005 | Schaenzer et al. | |
| 6,967,807 B2 | 11/2005 | Settje et al. | |
| 7,804,661 B2 | 9/2010 | Wilcox et al. | |
| 8,297,113 B2 | 10/2012 | Liners et al. | |
| 9,129,633 B1 * | 9/2015 | Gan | G11B 5/6076 |
| 9,230,594 B2 | 1/2016 | Kunkel et al. | |
| 9,679,595 B1 | 6/2017 | Zhang et al. | |
| 2003/0035361 A1 | 2/2003 | Knight et al. | |

(Continued)

*Primary Examiner* — Peter Vincent Agustin
(74) *Attorney, Agent, or Firm* — Hollingsworth Davis, LLC

(57) ABSTRACT

An apparatus comprises magnetic recording disk surfaces and magnetic recording heads comprising a leading and a following head. A controller moves the heads so that the leading head, at a passive fly height, follows a first track of a first disk surface containing a passive thermal asperity (PTA), and the following head, at a passive fly height, follows a first track of a second disk surface. The PTAs on tracks of the second disk surface define virtual PTAs on corresponding tracks of the first disk surface. The controller moves the heads away from the respective first tracks and to neighboring tracks to avoid the PTA and virtual PTAs. The controller is configured to move the heads back to the respective first tracks so that a write or read operation can be performed by the leading head.

22 Claims, 9 Drawing Sheets

(56) References Cited

U.S. PATENT DOCUMENTS

| | | | |
|---|---|---|---|
| 2008/0192377 A1* | 8/2008 | Lee ......................... | G11B 5/40 360/59 |
| 2015/0146505 A1* | 5/2015 | Seigler ................. | G11B 7/1387 369/13.17 |
| 2015/0162038 A1* | 6/2015 | MacKen ................ | G11B 5/607 360/75 |

* cited by examiner

*FIGURE 6*

| PTA No | PTA true location | | Track offset (tracks) | PTA Table of H0 | PTA Table of H1 |
|---|---|---|---|---|---|
| | Surface | Track | | | |
| 1 | 0 | 5888 | 1974 | 5888 | 7862 |
| 2 | 0 | 21029 | 1982 | 21029 | 23011 |
| 3 | 0 | 127016 | 2029 | 127016 | 129045 |
| 4 | 0 | 167392 | 2040 | 167392 | 169432 |
| 5 | 0 | 318802 | 2023 | 318802 | 320825 |
| 6 | 1 | 33111 | 1988 | 31123 | 33111 |
| 7 | 1 | 73506 | 2007 | 71499 | 73506 |
| 8 | 1 | 189624 | 2044 | 187580 | 189624 |
| 9 | 1 | 270375 | 2043 | 268332 | 270375 |
| 10 | 1 | 335956 | 2013 | 333943 | 335956 |

602 Real PTAs
604 Virtual PTAs
606 Virtual PTAs
608 Real PTAs

FIGURE 9

| Zone | Seek away | | | Seek back | | | Total |
|---|---|---|---|---|---|---|---|
| | μ | σ | μ+3σ | μ | σ | μ+3σ | μ+3σ |
| OD | 50 | 3 | 59 | 67 | 4 | 78 | 137 |
| MD | 50 | 3 | 58 | 69 | 4 | 81 | 139 |
| ID | 51 | 3 | 61 | 67 | 3 | 77 | 137 |

MAGNETIC RECORDING SYSTEM EMPLOYING PASSIVE THERMAL ASPERITY AVOIDANCE

SUMMARY

Embodiments are directed to a method comprising moving a plurality of magnetic recording heads in unison relative to a plurality of magnetic recording disk surfaces. The plurality of heads comprises a leading head and at least one following head. The method comprises moving the heads so that the leading head, at a passive fly height, follows a first track of a first disk surface containing a passive thermal asperity (PTA), and the following head, at a passive fly height, follows a first track of a second disk surface opposing the first disk surface. PTAs on tracks of the second disk surface define virtual PTAs on corresponding tracks of the first disk surface. The method also comprises moving the heads away from the respective first tracks and to neighboring tracks of the first and second disk surfaces to avoid the PTA and virtual PTAs. The neighboring tracks are devoid of PTAs and virtual PTAs. The method further comprises moving, after avoidance of the passive thermal asperity by the leading head, the heads so that the leading and following heads return to the respective first tracks. After thermally actuating the leading head and avoiding the passive thermal asperity, the method comprises writing data to or reading data from the first track of the first disk surface by the leading head.

Embodiments are directed to an apparatus comprising a plurality of magnetic recording disk surfaces and a plurality of recording heads comprising a leading head and at least one following head. Each of the heads is positioned proximate one of the disk surfaces and the heads are movable in unison relative to the disk surfaces. A controller is configured to move the heads so that the leading head, at a passive fly height, follows a first track of a first disk surface containing a passive thermal asperity (PTA), and the following head, at a passive fly height, follows a first track of a second disk surface opposing the first disk surface. The PTAs on tracks of the second disk surface define virtual PTAs on corresponding tracks of the first disk surface. The controller is configured to move the heads away from the respective first tracks and to neighboring tracks of the first and second disk surfaces to avoid the PTA and virtual PTAs. The neighboring tracks are devoid of PTAs and virtual PTAs. The controller is also configured to move, after avoidance of the passive thermal asperity by the leading head, the heads so that the leading and following heads return to the respective first tracks. The controller is further configured to write data to or read data from the first track of the first disk surface by the leading head after thermal actuation of the leading head and avoidance of the passive thermal asperity.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 6 shows a PTA mapping table that contains real and virtual PTA information for two surfaces (upper and lower) of a disk in accordance with various embodiments;

FIG. 9 is a table of representative seek time statistics for a head performing seek-away and seek-back operations from a home track to/from a target track at different disk locations in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A transducer of a magnetic storage device includes components for recording information to and reading information from a magnetic recording medium. The transducer is usually housed within a small ceramic block called a slider. Sliders are aerodynamically designed to fly on a cushion of air that is generated due to rotating a magnetic recording disk at high speeds. The slider has an air bearing surface (ABS) that may include rails and a cavity or depression between the rails. The ABS is that surface of the slider nearest to the disk as the disk is rotating. Air is dragged between the rails and the disk surface causing an increase in pressure that tends to force the head away from the disk. Air is simultaneously rushing past the cavity or depression in the ABS which produces a lower than ambient pressure area at the cavity or depression. The low-pressure area near the cavity counteracts the higher pressure at the rails. These opposing forces equilibrate so the slider flies over the surface of the disk at a particular fly height. The fly height is the distance between the disk surface and the slider's ABS surface.

During operation of a disk drive, the distance between the slider and the disk is very small, on the order of several nanometers. For accurate write and read operations to occur, it is desirable to have a relatively small distance or spacing between a slider and its associated magnetic recording medium. This distance or spacing is known head-disk spacing, which is interchangeable with the term fly height. By reducing the fly height, a slider is typically better able to both write and read data to and from a medium.

Figure 1:
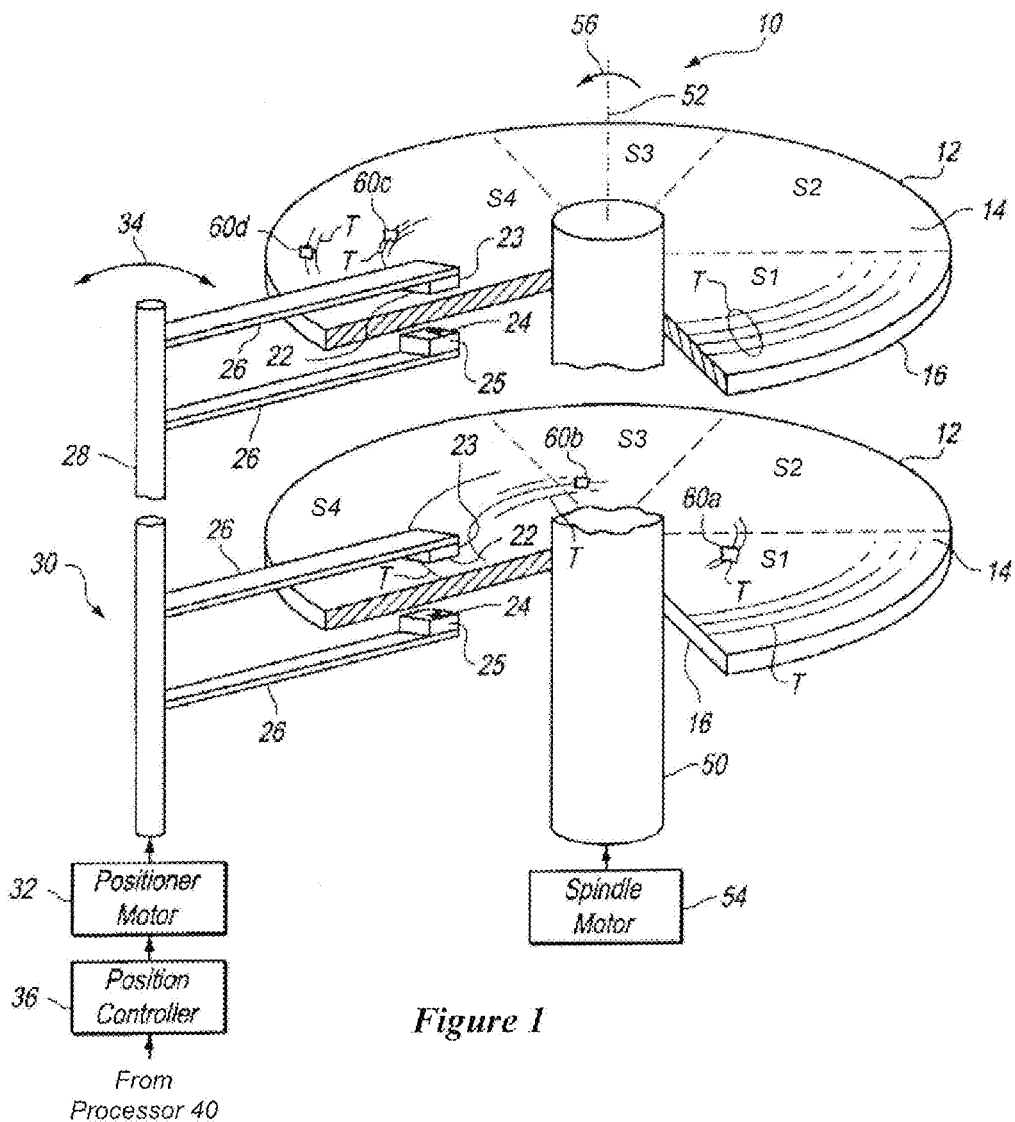
FIG. 1 illustrates a portion of a disk drive which includes multiple data storage media and multiple recording heads in accordance with various embodiments.

Referring to FIG. 1, a portion of a disk drive 10 is shown which includes multiple data storage media 12 (only two of which are shown), each of which has upper and lower surfaces 14, 16 on which data is stored. In some embodiments, the storage media 12 are configured for heat-assisted magnetic recording (HAMR). In other embodiments, the storage media 12 are configured for perpendicular magnetic recording (PMR). Storage media 12 are magnetic disks and store data at storage locations on multiple tracks T (only a few tracks on upper surface 14 of each medium 12 are shown). The tracks T of all surfaces 14, 16 on all media 12 that are located at the same radial position define a "cylinder" of data storage locations. Each surface 14, 16 is subdivided into sectors, only four of which, denoted as sectors S1-S4, are shown. Thus, in this example, each cylinder of data locations includes 4×N sectors S1-S4 of data storage locations (N being the number of disk surfaces 14, 16).

A pair of transducers 22, 24 are respectively associated with upper and lower surfaces 14, 16 of each storage medium 12 for interacting with the data storage locations on tracks T. In some embodiments, the transducers 22, 24 are configured for HAMR. In other embodiments, the transducers 22, 24 are configured for PMR. The details of transducers 22, 24 are not shown in FIG. 1, but it will be understood that each transducer 22, 24 includes a magnetic writer for writing data to the storage locations, and a reader (e.g., a giant magnetoresistive element) for reading data from the storage locations. Each transducer 22, 24 is mounted on a slider 23, 25 which is supported in a known manner at the free end of an arm 26. The opposite ends of arms 26 extend from a rotatable column 28 of a transducer positioner assembly 30. Arms 26 are all positioned at the same angular orientation with respect to column 28 so that, at any given time, positioner assembly arranges all transducers 22, 24, in the same cylinder and over the same location on surfaces 14, 16. In this manner, the transducers 22, 24 move as a group in unison relative to the disk surfaces 14, 16.

Transducers 22, 24 are moved across surfaces 14, 16 by a positioner motor 32, which rotates column 28 bidirectionally (as shown by arrow 34) in response to commands from a position controller 36. This operation is well known, but briefly, when a processor 40 determines that transducers 22, 24 are to be moved across surfaces 14, 16, the processor 40 sends appropriate control signals to position controller 36, which operates positioner motor 32. As column 28 is rotated by positioner motor 32, it swings arms 26 together, thereby moving transducers 22, 24 in unison in an arc across surfaces 14, 16. In this way, controller 36 positions transducers 22, 24 together at a cylinder selected by processor 40.

A hub 50 passes through the centers of storage media 12 along a vertical axis 52. A spindle motor 54 rotates hub 50, and hence storage media 12, about central axis 52 in the direction of arrow 56 (e.g., counterclockwise) at a high rate of speed (such as 7,200 or 10,000 rpm). The rapid rotation of surfaces 14, 16 induces air flow beneath sliders 23, 25, which respond by elevating transducers 22, 24 slightly from surfaces 14, 16 by a distance referred to as the fly height. The data storage density of media 12 (that is, the number of storage locations that can exist on each track T) is inversely related to the fly height of transducers 22, 24. That is, as the data storage density on media 12 is increased, the fly height of transducers 22, 24 must be decreased. One danger presented by such low fly heights is the increased risk of collisions between transducers 22, 24 and passive thermal asperities (60a-60d) on surfaces 14, 16.

A thermal asperity is a defect on a surface of magnetic storage media that projects upwardly from the plane of the disk surface. A thermal asperity can be a passive thermal asperity or a non-passive thermal asperity. A passive thermal asperity is an asperity having a height that will cause a collision with a transducer spaced apart from the surface at a passive fly height (no heater active). The transducers typically operate at a passive fly height during track following, seek, and idle operations, for example. A non-passive thermal asperity has a height less than that of a passive thermal asperity, such that a collision does not occur between the non-passive thermal asperity and a transducer operating at a passive fly height. However, the transducers can collide with a non-passive thermal asperity when the transducers are operating at a lower active fly height (heater active), such as during read and write operations.

Contact between the transducers and a passive thermal asperity can cause burnishing and/or permanent damage to the transducers. As such, it is current practice to map data tracks containing one or more passive thermal asperities in order to avoid collision between the mapped passive thermal asperities and the transducers. The inability to store data on data tracks containing a passive thermal asperity reduces aerial density of the disk drive.

High media surface roughness and insufficient aerial density entitlement are significant issues affecting current hard disk drives, including those configured for HAMR. HAMR media may potentially be rougher than current PMR media and, therefore, contain more thermal asperities, especially passive thermal asperities. Thermal asperity proliferation further reduces aerial density entitlement as a large guardband (e.g., 140 tracks) is applied for each passive thermal asperity. The issue of aerial density loss due to thermal asperity mapping is much worse for a HAMR disk drive due to the use of "cylinder mapping" of passive thermal asperities on each disk surface. According to a cylinder mapping approach, each disk surface needs to map out the passive thermal asperities of its own and all other surfaces corresponding to the physic locations of the cylinder. For example, given a 4-disk/8-head disk drive, Surface 0 contains the passive thermal asperity map-outs of Surfaces 0-7. Surface 1 contains the passive thermal asperity map-outs of Surfaces 0 and 2-7 (likewise for all other surfaces). Use of a cylinder mapping approach results in a significant aerial density loss due to passive thermal asperity mapping multiplied by 8 surfaces. HAMR drives with a large number of HAMR media experience greater aerial density loss due to passive thermal asperity cylinder mapping.

Embodiments of the present disclosure are directed methods and apparatuses for recording on tracks of a HAMR or PMR medium that contain one or more passive thermal asperities. Embodiments of the present disclosure provide for an increase in aerial data density of magnetic recording media, particularly for HAMR media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR slider, sometimes referred to as a read/write element, recording head, read head, write head, read/write head, etc., includes magnetic read and write transducers similar to those on current disk drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 2:
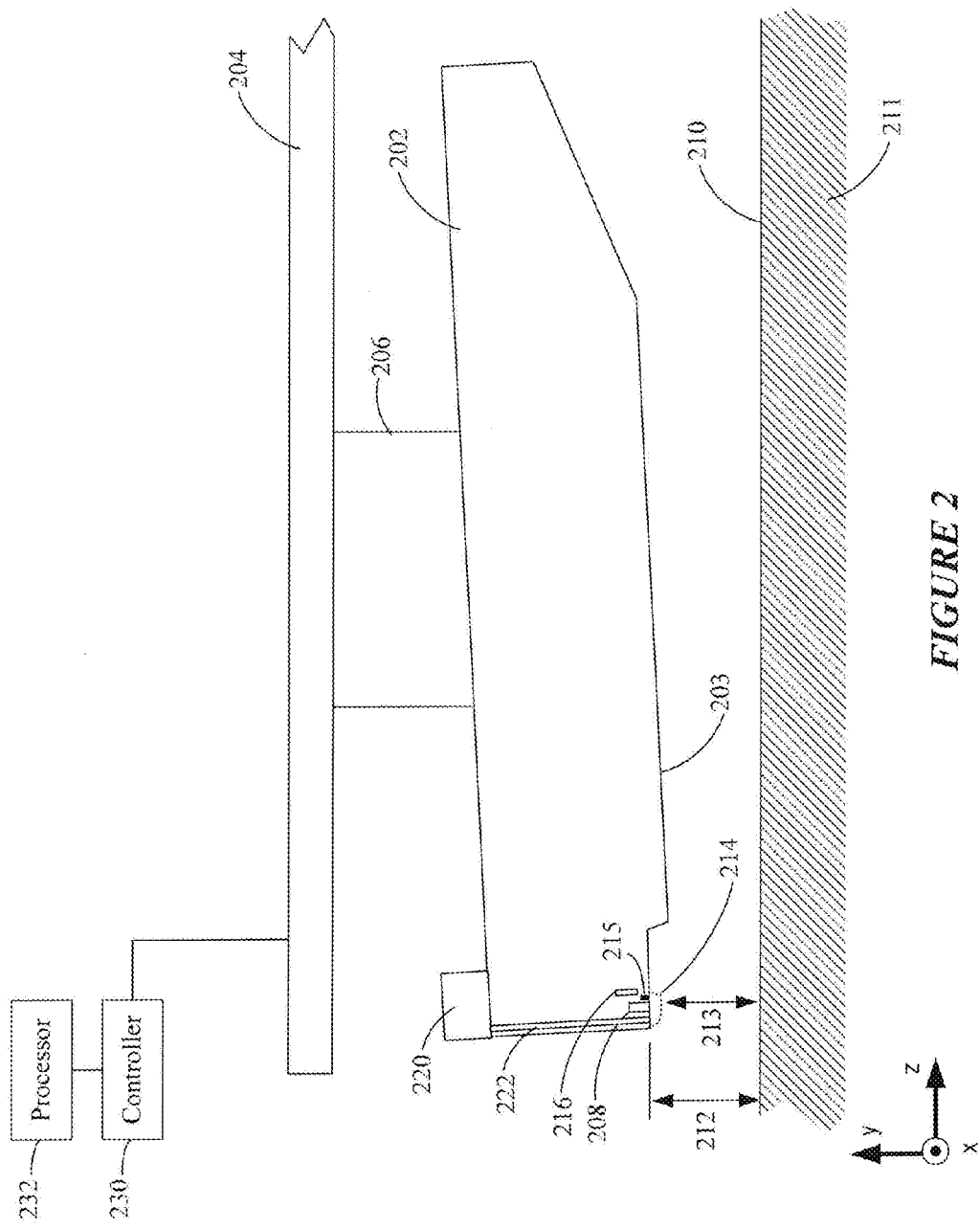
FIG. 2 shows a side view of a HAMR slider configured for magnetic recording according to a representative embodiment.

FIG. 2 shows a side view of a HAMR slider 202 configured for magnetic recording according to a representative embodiment. The slider 202 may be used in a magnetic data storage device, e.g., a HAMR disk drive. The slider 202 is coupled to an arm 204 by way of a suspension 206 that allows some relative motion between the slider 202 and arm 204. The slider 202 includes read/write heads 208 at a trailing edge that are held proximate to a surface 210 of a magnetic recording medium 211, e.g., magnetic disk. In HAMR embodiments, the slider 202 further includes a laser 220 and a waveguide 222. The waveguide 222 delivers light from the laser 220 to components (e.g., a near-field transducer) near the read/write heads 208.

When the slider 202 is located over surface 210 of recording medium 211, a flying height 212 is maintained between the slider 202 and the surface 210 by a downward force of arm 204. This downward force is counterbalanced by an air cushion that exists between the surface 210 and an air bearing surface 203 (also referred to as a "media-facing surface") of the slider 202 when the recording medium 211 is rotating. It is desirable to maintain a predetermined slider flying height 212 over a range of disk rotational speeds during both reading and writing operations to ensure consistent performance. Region 214 is a "close point" of the slider 202, which is generally understood to be the closest spacing between the read/write heads 208 and the magnetic recording medium 211, and generally defines the head-to-disk spacing 213.

To account for both static and dynamic variations that may affect slider flying height 212, the slider 202 may be configured such that a region 214 of the slider 202 can be configurably adjusted during operation in order to finely adjust the head-to-disk spacing 213. This is shown in FIG. 2 by a dotted line that represents a change in geometry of the region 214. In this example, the geometry change may be induced, in whole or in part, by an increase or decrease in temperature of the region 214 via a heater 216. The heater 216 can be representative of a reader heater or a writer heater. A contact sensor 215, such as a TCR sensor, is shown situated at or near the close point 214 (e.g., adjacent the read/write heads 208, such as near the write head or the read head).

A controller 230 is shown coupled to the slider 202. The controller 230 can incorporate or be coupled to a processor 232. Generally, the controller 230 at least includes logic circuitry for controlling the functions of an apparatus that includes at least the slider 202 and recording medium 211, and may include other components not shown. The controller 230 may include or be coupled to interface circuitry such as preamplifiers, buffers, filters, digital-to-analog converters, analog-to-digital converters, etc., that facilitate electrically coupling the logic of the controller 230 to the analog signals used by the slider 202 and other components not shown. The controller 230 is configured to implement the passive thermal asperity avoidance methodologies described herein, such as that shown in FIG. 3.

Figure 3:
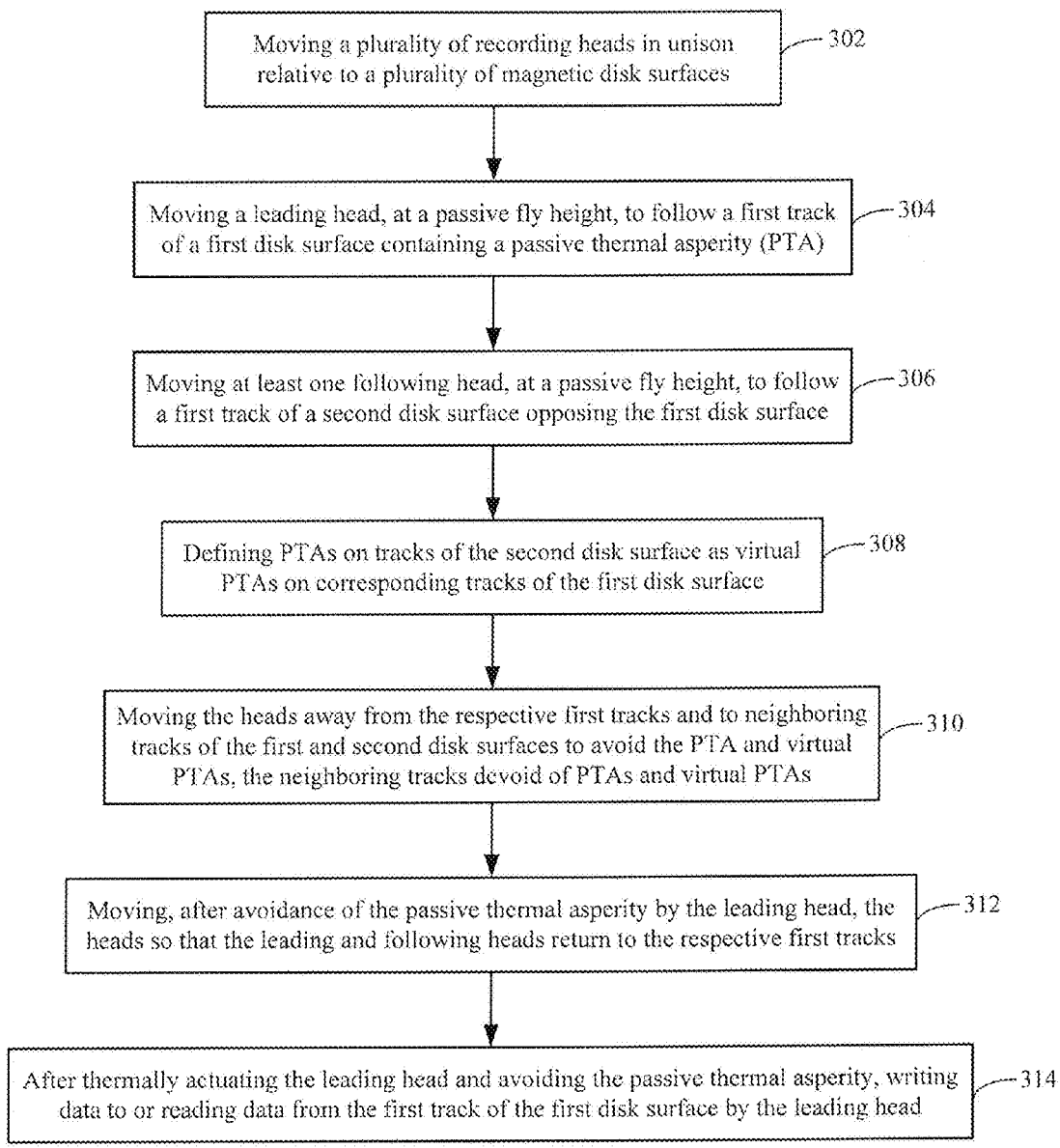
FIG. 3 is a method of writing data to or reading data from magnetic recording media containing passive thermal asperities in accordance with various embodiments.

FIG. 3 is a method of writing data to or reading data from magnetic recording media containing passive thermal asperities (PTAs) in accordance with various embodiments. The method of FIG. 3 involves moving 302 a plurality of recording heads in unison relative to a plurality of magnetic recording disk surfaces. The recording heads include a leading head (enabled for writing or reading) and one or more following heads (currently inactive for writing or reading). The method involves moving 304 the leading head, at a passive fly height, to follow a first track of a first disk surface containing a PTA. The method involves moving 306 at least one following head, at a passive fly height, to follow a first track of a second disk surface opposing the first disk surface. The PTAs of the second disk surface are defined 308 as virtual PTAs on corresponding tracks of the first disk surface. The method also involves moving 310 the head away from the respective first tracks and to neighboring tracks of the first and second disk surfaces to avoid the PTA and virtual PTAs. The neighboring tracks are tracks devoid of PTAs and virtual PTAs. The method involves moving 312, after avoidance of the passive thermal asperities by the leading head, the heads so that the leading and following heads return to the respective first tracks. The method further involves, after thermally actuating the leading head and avoiding the passive thermal asperity, writing 314 data to or reading data from the first track of the first disk surface by the leading head.

Figure 4:
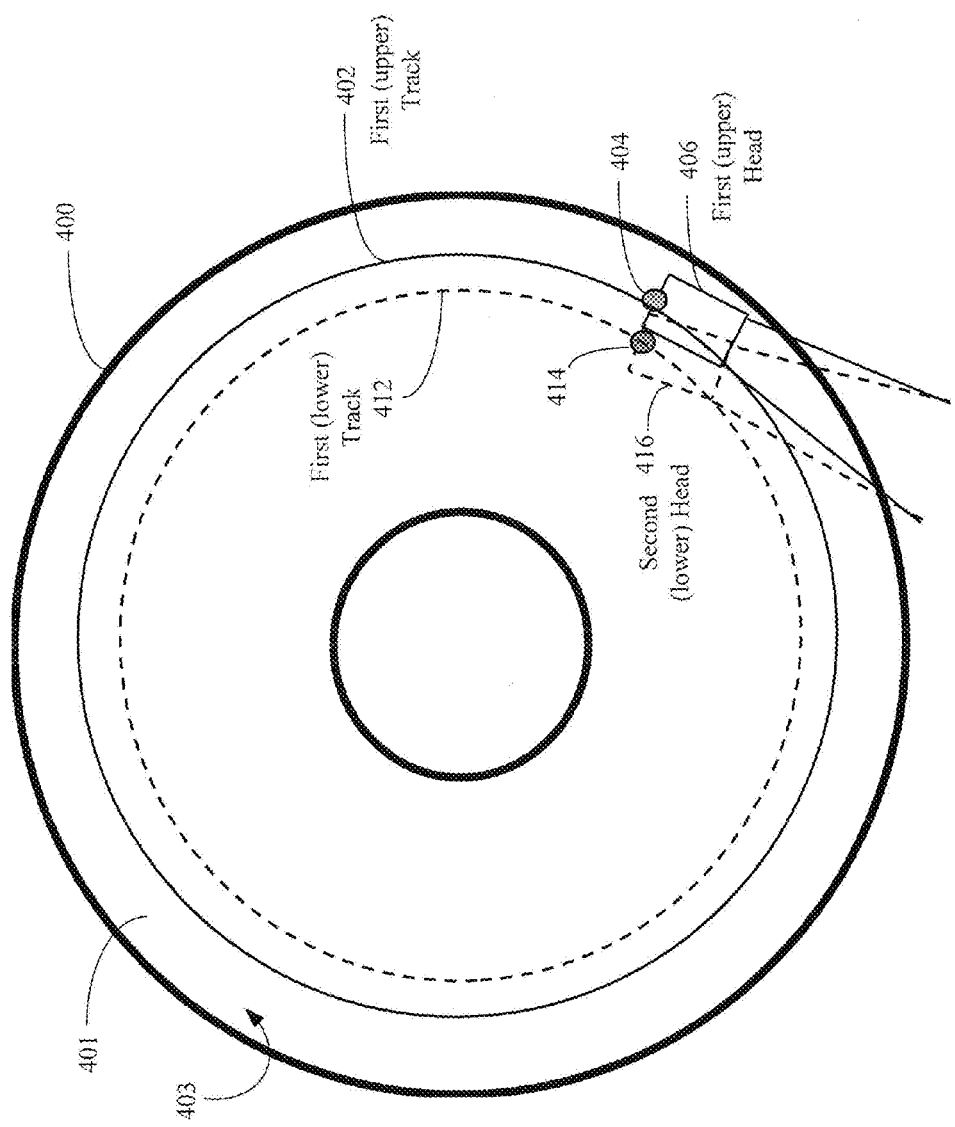
FIG. 4 is an illustration of a disk comprising a track containing a passive thermal asperity that can be avoided, while remaining portions of the track can be used for write and read operations in accordance with various embodiments.

FIG. 4 is an illustration of a magnetic recording medium (disk) 400 which includes a first surface 401 (upper surface represented by solid lines) and a second surface (lower surface represented by dashed lines) 403. FIG. 4 also shows two recording heads 406, 416 that extend from a common positioner (not shown) and move in unison across the first and second surfaces 401, 403 of the disk 400. The first (upper) head 406 is positioned above a first track 402 of the upper surface 401, and the second (lower) head 416 is positioned above a first track 412 of the lower surface 403. The first tracks 402 and 412 define a cylinder. In this illustrative embodiment, the first head 406 is the leading head, such that the first head 406 will be used for a write or read operation on the first track 402. The second head 416 in this illustrative embodiment is the following head, such that the second head 416 is inactive during the write/read operation of the first head 406.

In FIG. 4, the first track 412 of the lower surface 403 contains a real PTA 414. In this illustration, the first track 402 of the upper surface 401 is devoid of a real PTA. However, the real PTA 414 on the lower surface 403 is defined as a virtual PTA for the first track 402 on the upper surface 401. According to embodiments of the disclosure, the heads 406, 416 are moved to a neighboring track to avoid all actual and virtual PTAs on first tracks 402, 412, even though the first track 402 associated with the leading head 406 is devoid of a real PTA. After avoidance of any real and virtual PTAs on first tracks 402, 412, the heads 406, 416 are moved back to first tracks 402, 412 to perform a write or read operation by the leading head 406.

As will be described hereinbelow, a PTA map or table is constructed that identifies all actual and virtual PTAs on all surfaces of the media of a disk drive. The PTA map or table is constructed at the time of disk drive manufacturing, typically during a certification process. To construct the PTA table of a leading head, the PTAs of other head surfaces are reflected to the leading head surface as virtual PTAs. The virtual PTAs have the servo tracks/sectors equivalent to the real PTAs of other surface(s). For example, and as shown in FIG. 4, a real PTA on the lower disk surface 403 is casted as a virtual PTA on the upper disk surface 401. When the first head 406 is the leading head, head 406 needs to avoid any virtual PTAs in order to protect the second head 416 (and any other following heads). Thus, the leading head needs to avoid both its own PTAs and all virtual PTAs during track following (read/write) and seek operations. Notably, avoiding actual and virtual PTAs for a cylinder of tracks (e.g., tracks 402, 412) can be based entirely on the PTA map established for the leading head 406.

For example, a disk drive may include four disks with two heads associated with each disk (for a total of 8 heads). In this example, Head 0 is the leading head and Heads 1-7 are following heads. The PTA map for Surface 0 associated with Head 0 includes a mapping of any actual PTAs on Surface 0 and all virtual PTAs on Surfaces 1-7 associated with Heads 1-7. As such, all actual and virtual PTAs for a cylinder of tracks for Surfaces 0-7 can be avoided by accessing the PTA map for Surface 0. This approach avoids the need to access the PTA mappings of all Surfaces 0-7 when moving the Heads 0-7 to/from neighboring tracks. This approach provides for concurrent protection of all heads and disk surfaces when avoiding PTAs in a highly efficient manner.

Figure 5:
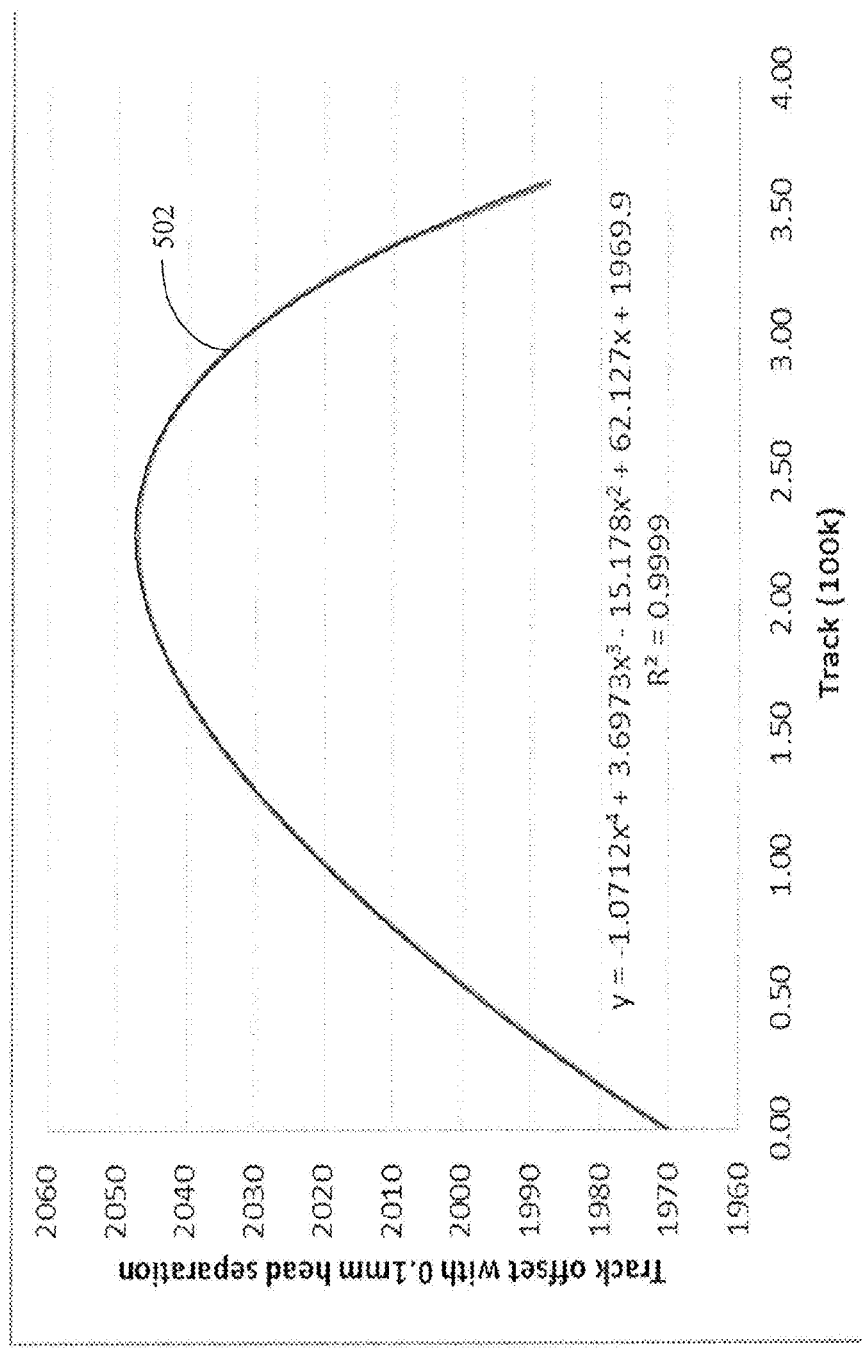
FIG. 5 is a graph showing track offset versus track number, from which a transfer function, $f$, can be derived for building a passive thermal asperity mapping table in accordance with various embodiments.

Although the physical separations among heads in a disk drive are fixed, their relative track offsets will change with disk radii due to the skew angle effect. A graph showing track offset versus track number is provided in FIG. 5. To find the virtual PTA locations of a disk surface, the first step is to build a transfer function, $f$. The transfer function, $f$ describes the relationship of the track offset between Head 0 and Head 1 versus the physical track (radius) of the leading head. According to one procedure, head track offset is measured through a head switch at a few pre-determined test tracks. The test tracks are selected to cover the positive, zero, and negative skew angles. A polynomial fit of the track offset versus the track number is performed to obtain the transfer function, $f$. A representative transfer function, $f$ is shown in FIG. 5. The determined polynomial equation (transfer function, $f$) is used to calculate the virtual PTAs. For the leading head, its own PTAs and virtual PTAs are combined to form the PTA table, a representative example of which is shown in FIG. 6.

The PTA table shown in FIG. 6 contains real and virtual PTA information for two surfaces (upper and lower) of a magnetic recording disk in accordance with various embodiments. A first surface, Surface 0, is associated with a first head, H0. A second surface, Surface 1, is associated with a second head, H1. The PTA table includes information for 10 PTAs, five on Surface 0 and five on Surface 1. The track number and track offset for each of the 10 PTAs is provided in the PTA table. The PTA table identifies the real PTAs 602 and virtual PTAs 604 for head H0. The PTA table also identifies the real PTAs 608 and virtual PTAs 606 for head H1.

In a disk drive comprising a multiplicity of heads that move in unison across a multiplicity of disk surfaces, every write or read operation is carried out by an active head (a leading head) while one or more inactive heads (following heads) move together with the active head as a group. As was discussed previously, a PTA table is constructed for every disk surface of a disk drive. The PTA table contains the servo tracks/sectors of PTAs on each disk surface and all virtual PTAs on the other disk surfaces. As such, all PTAs and virtual PTAs are mapped out in the PTA table for each disk surface.

Prior to contacting a PTA on a track by a leading head, the leading head and all following heads are moved to a seek-away location, which can be a neighboring band of consecutive tracks. The seek-away location is a track or tracks that do not have PTAs for all heads. Using the virtual PTA concept disclosed herein, avoiding virtual PTAs by a leading head (active head) will avoid real PTAs by the inactive heads (following heads). It is desirable to minimize time loss (time unit is in servo sector number) during seek-away and seek-back operations, so more data can be recorded for tracks containing a PTA. A seek-away track can be predetermined during a disk drive testing process. Determining a seek-away track involves measuring a guardband that is provided around a PTA. The guardband can be many tracks wide (e.g., 140 tracks wide). According to some embodiments, the distance from the PTA track to the seek-to track (neighboring track) can be determined by the equation: TA guard band+(max PTA width)/2+margin (for example, 20 tracks).

Seek-away and seek-back operations result in a number of servo sectors of PTA tracks that are inaccessible (non-recordable), as is indicated in the table of FIG. 9 discussed hereinbelow. A longer non-recordable range (unit is based on servo sector numbers) results in a smaller recordable range. However, a non-recordable range that is too short can result in a head missing the first recordable sector of the seek-back (home) track. This would result in waiting for one more revolution to initiate the recording, which negatively impacts performance. Statistically determining the non-recordable range of PTA tracks can minimize recording and performance losses.

In some embodiments, tracks containing one or more PTAs can be used as spare sectors or last recording space. Seek-away and seek-back operations can reduce drive performance. Using PTA tracks for spare sectors or last storage space can avoid a head frequently accessing PTA tracks. It is noted that spare sectors are unlikely to be used unless a disk drive has too many bad sectors or insufficient capacity.

Figure 7:
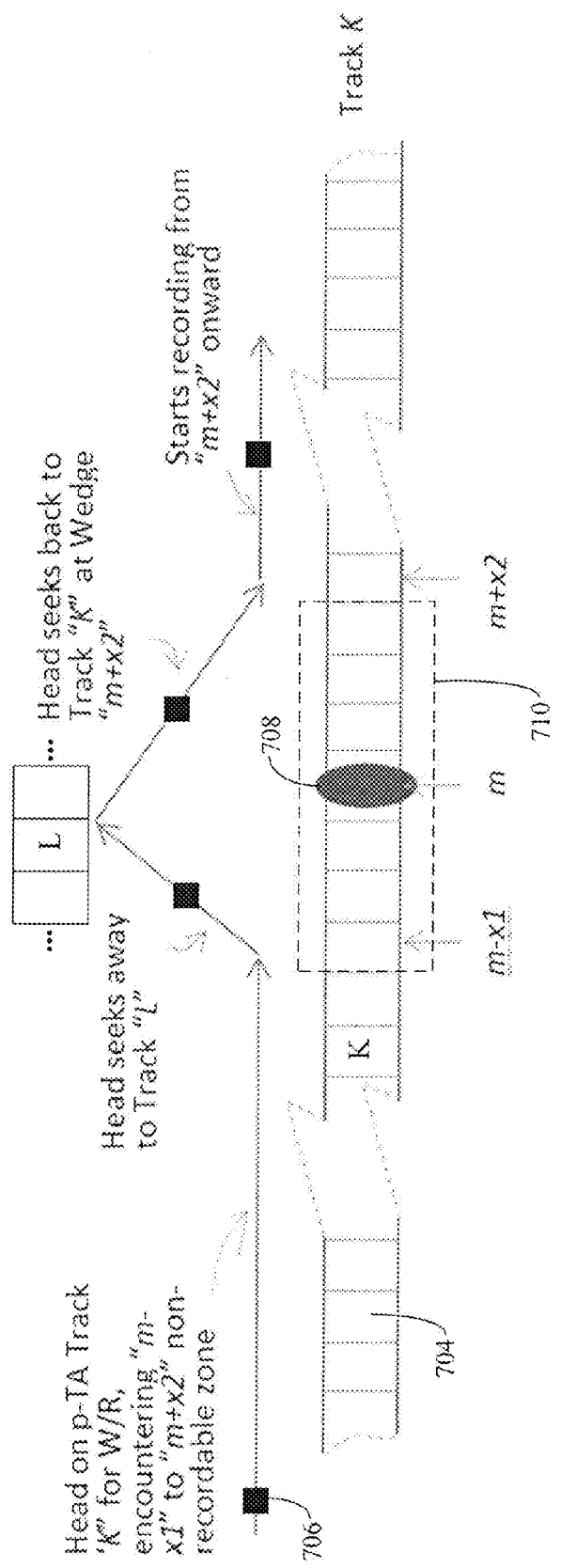
FIG. 7 illustrates a process of recording on non-PTA sectors of a track that contains a PTA while keeping the head away from the PTA in accordance with various embodiments.

FIG. 7 illustrates a process of recording on non-PTA sectors of a track that contains a PTA while keeping the head away from the PTA in accordance with various embodiments. As is shown in FIG. 7, track K includes a number of servo sectors 704 over which a head 706 passes. Track K is shown to include a PTA 708 at servo sector (wedge) m. It is understood that for purposes of this discussion, PTA 708 can be an actual PTA of track K or a virtual PTA of track K. It is also understood that PTA 708 and all other PTAs of each disk surface of a HAMR drive have been mapped during a certification process at the factory. The PTA table includes the servo wedge number (e.g., m) for each PTA identified during the certification process.

A non-recordable zone 710 is defined around the PTA 708. For the non-recordable zone 710 shown in FIG. 7, servo wedges m−x1 and m+x2 are marked as non-recording wedges for track K. When the head 706 reaches servo wedge m−x1, a seek-away operation moves the head 706 from track K to track L, which is a track devoid of real and virtual PTAs. Track L can be a track located in the inner diameter (ID) or outer diameter (OD) direction relative to track K. The seek length is preferably kept minimal based on reliability, aerial density, and performance factors. Track L can be 100 tracks away from track K, for example.

After the head 706 passes servo wedge m containing PTA 708, a seek-back operation moves the head 706 from track L back to track K at servo wedge m+x2. A write or read operation is initiated starting at servo wedge m+x2. It is noted that the head 706 does not need to settle when moving from track K to track L during a seek-away operation. However, the head 706 does need to settle after moving from track L to track K during a seek-back operation in order to initiate a write or read operation after avoiding the PTA 708. As such, x2 is generally greater than x1 when determining the size of the non-recordable zone 710.

In some cases, a track can contain two or more spaced-apart PTAs that can be avoided in accordance with various embodiments. The two or more PTAs can be any combination of real and virtual PTAs. This scenario is likely to occur for multi-surface disk drives, such as a drive with 5 disks and 10 recording surfaces. In general, if the circumferential gap between two PTAs is less than the total servo sectors to be skipped during seek-away and seek-back operations, then a seek-away operation can be performed prior to the first PTA and a seek-back operation can be performed after passing the second PTA. Otherwise, seek-away and seek-back operations can be performed for each of the PTAs as previously described.

Figure 8:
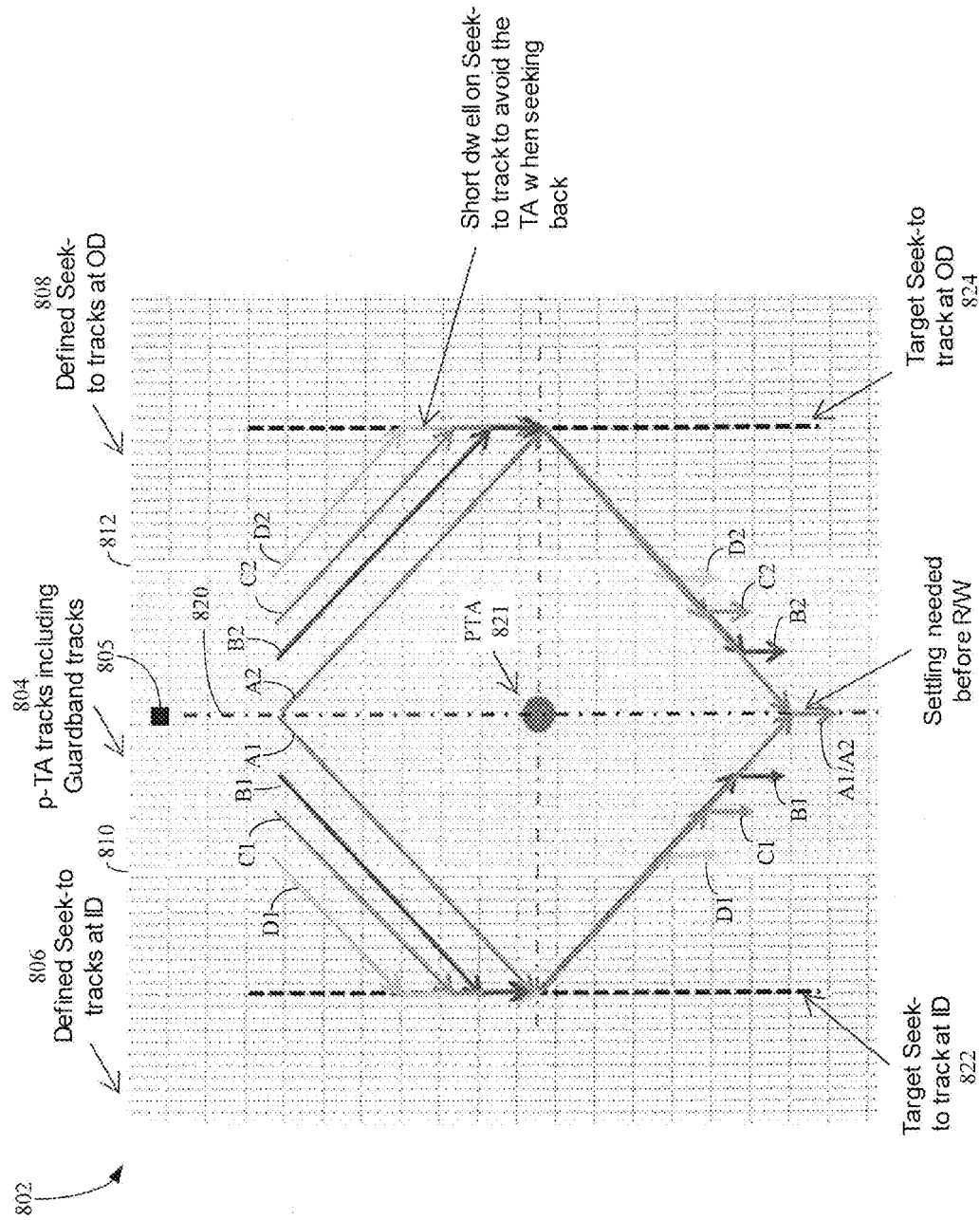
FIG. 8 shows a portion of a disk containing a PTA and various strategies for avoiding the PTA in accordance with various embodiments.

FIG. 8 shows a portion of a magnetic recording disk 802 containing a PTA 821 and various strategies for avoiding the PTA 821 in accordance with various embodiments. The PTA 821 is centered on track 820 and is several tracks in width. A number of tracks around the PTA 821 are referred to as PTA tracks 804. The PTA tracks 804 are bounded by guardband tracks 810 and 812. In FIG. 8, a number of seek-to tracks 806 located toward an ID of the disk 802 are shown to the left of the guardband tracks 804. The seek-to tracks 806 include ID seek-to track 822. A number of seek-to tracks 808 located toward at an OD of the disk 802 are shown to the right of the guardband tracks 804. The seek-to tracks 808 include OD seek-to track 824.

A head 805 is shown positioned within the PTA tracks 804. Depending on the location of the head 805 within the PTA tracks 804, the head will be moved to either the ID seek-to track 822 or the OD seek-to track 824 in order to avoid the PTA 821. If the head 805 is positioned above center track 820, for example, the head 805 can be moved during a seek-away operation to either the ID seek-to track 822 (a long path A1) or the OD seek-to track 824 (a long path A2). Moving the head 805 along path A1 or A2 requires little or no dwell time at the ID seek-to track 822 or the OD seek-to track 824 in order to avoid the PTA 821. The head 805 can be immediately moved via a seek-back operation back to track 820 along path A1 or A2, where some settling time is needed before performing a write or read operation on track 820.

FIG. 8 shows a number of different seek-away and seek-back paths (B1-D1 and B2-D2) that can be taken by head 805 depending on the location of head 805 within the guardband tracks 804. As can be seen in FIG. 8, a longer dwell time is needed on the seek-to tracks 822, 824 to avoid the PTA 821 when the seek-away operation is initiated close to the guardbands 810, 812. A shorter dwell time is needed on the seek-to tracks 822, 824 to avoid the PTA 821 when the seek-away operation is initiated close to the center track 805 of the guardband tracks 804. For example, when head 805 is located at the start of path D1 (nearest guardband 810), a longer dwell time is needed when compared to a seek-away operation initiated at the start of path B1 (closer to the center track 805). The seek length will vary depending on disk drive design particulars. For example, the seek length can vary between 30 and 100 servo sectors depending on the track location in the PTA tracks 804. Irrespective of the path taken by the head 805 from a home track to avoid the PTA 821, some settling time is needed when returning to the home track prior to initiating a write or read operation.

FIG. 9 is a table of representative seek time statistics for a head performing seek-away and seek-back operations from a home track to/from a target track located 100 tracks away from the home track at ID, MD (middle diameter), and OD locations. In this representative example, the one-side PTA padding size is 70 tracks. Three zones at ID, MD, and OD locations were selected to perform seek-away and seek-back operations by 100 tracks. Seek time was recorded in terms of servo sector numbers. The longest seek-away operation took about 61 sectors (mean+3σ) to complete. The longest seek-back operation took about 81 sectors (mean+3σ) to complete. As was previously discussed, seek-away operations are shorter in duration than seek-back operations since no settling time is needed at the seek-away track.

In this illustrative example, each track comprises 376 servo sectors. Subtracting the 61 seek-away sectors and the 81 seek-back sectors from 376 total servo sectors leaves a total of 234 servo sectors available for recording. In this example, 62% of the track length is made available for recording using a PTA avoidance methodology of the present disclosure. In contrast, none of the track length would be available for recording when using conventional thermal asperity avoidance techniques.

It is noted that the above-described PTA avoidance methodology need not be implemented for non-passive thermal asperities. As was discussed previously, non-passive thermal asperities can be avoided by a slider flying in an inactive or low-power mode (e.g., no or little power supplied to the heater). A non-passive thermal asperity on a track can be avoided by simply reducing or eliminating heater power to the slider ahead of the non-passive thermal asperity so that the slider flies above the non-passive thermal asperity. After passing above the non-passive thermal asperity, heater power is applied to the slider and a write or read operation is then performed on the track.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. It is understood that embodiments of the disclosure are directed to HAMR or PMR implementations.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
moving a plurality of magnetic recording heads in unison relative to a plurality of magnetic recording disk surfaces, the plurality of heads comprising a leading head and at least one following head;
moving the heads so that:
the leading head, at a passive fly height, follows a first track of a first disk surface containing a passive thermal asperity (PTA); and
the following head, at a passive fly height, follows a first track of a second disk surface opposing the first disk surface, wherein PTAs on tracks of the second disk surface define virtual PTAs on corresponding tracks of the first disk surface;
moving the heads away from the respective first tracks and to neighboring tracks of the first and second disk surfaces to avoid the PTA and virtual PTAs, the neighboring tracks devoid of PTAs and virtual PTAs;
moving, after avoidance of the passive thermal asperity by the leading head, the heads so that the leading and following heads return to the respective first tracks; and
after thermally actuating the leading head and avoiding the passive thermal asperity, writing data to or reading data from the first track of the first disk surface by the leading head.

2. The method of claim 1, wherein:
the PTAs have a height that is as high or higher than a fly height of the leading head at the passive fly height; and
the virtual PTAs have a height that is as high or higher than a fly height of the following head at the passive fly height.

3. The method of claim 1, comprising accessing a mapping of the virtual PTAs of the second disk surface to the first disk surface, such that a PTA map for the first disk surface comprises both the virtual PTAs of the second disk surface and the PTAs of the first disk surface.

4. The method of claim 3, comprising accessing only the PTA map for the first disk surface when moving the recording heads.

5. The method of claim 3, comprising accessing a table that maps the virtual PTAs of the first track of the second disk surface to the first track of the first disk surface such that a PTA map for the first track of the first disk surface comprises both the virtual PTAs of the first track of the second disk surface and the PTAs of the first track of the first disk surface, wherein:
moving the recording heads away from the respective first tracks to the neighboring tracks comprises accessing only the PTA map for the first track of the first disk surface; and
moving the recording heads to return to the respective first tracks comprises accessing only the PTA map for the first track of the first disk surface.

6. The method of claim 1, wherein the first tracks of the first and second disk surfaces are associated by a transfer function that characterizes relative track offsets of the respective first tracks at different skew angles.

7. The method of claim 6, wherein the different skew angles comprise positive, zero, and negative skew angles.

8. The method of claim 1, wherein the neighboring tracks comprise spare or last tracks of the first and second disk surfaces.

9. The method of claim 1, wherein the neighboring tracks are spaced from the first tracks by a distance defined by (a size of a PTA guard band)+(a maximum PTA width/2)+(a predetermined number of tracks as a margin).

10. The method of claim 1, wherein, after thermally actuating the leading head, the leading head is at an active fly height and the following head remains at the passive fly height.

11. The method of claim 1, wherein:
the plurality of magnetic recording heads are configured for heat-assisted magnetic recording; and
the plurality of magnetic recording disk surfaces are configured for heat-assisted magnetic recording.

12. An apparatus, comprising:
a plurality of magnetic recording disk surfaces;
a plurality of magnetic recording heads comprising a leading head and at least one following head, each of the heads positioned proximate one of the disk surfaces and the heads movable in unison relative to the disk surfaces; and
a controller configured to:
move the heads so that:
the leading head, at a passive fly height, follows a first track of a first disk surface containing a passive thermal asperity (PTA); and
the following head, at a passive fly height, follows a first track of a second disk surface opposing the first disk surface, wherein PTAs on tracks of the second disk surface define virtual PTAs on corresponding tracks of the first disk surface;
move the heads away from the respective first tracks and to neighboring tracks of the first and second disk surfaces to avoid the PTA and virtual PTAs, the neighboring tracks devoid of PTAs and virtual PTAs;
move, after avoidance of the passive thermal asperity by the leading head, the heads so that the leading and following heads return to the respective first tracks; and
after thermal actuation of the leading head and avoidance of the passive thermal asperity, write data to or read data from the first track of the first disk surface by the leading head.

13. The apparatus of claim 12, wherein:
the PTAs have a height that is as high or higher than a fly height of the leading head at the passive fly height; and
the virtual PTAs have a height that is as high or higher than a fly height of the following head at the passive fly height.

14. The apparatus of claim 12, wherein the controller is configured to access a mapping of the virtual PTAs of the second disk surface to the first disk surface, such that a PTA map for the first disk surface comprises both the virtual PTAs of the second disk surface and the PTAs of the first disk surface.

15. The apparatus of claim 14, wherein the controller is configured to access only the PTA map for the first disk surface when moving the recording heads.

16. The apparatus of claim 14, wherein the controller is configured to:
access a table that maps the virtual PTAs of the first track of the second disk surface to the first track of the first disk surface, such that a PTA map for the first track of the first disk surface comprises both the virtual PTAs of the first track of the second disk surface and the PTAs of the first track of the first disk surface;

move the recording heads away from the respective first tracks to the neighboring tracks after accessing only the PTA map for the first track of the first disk surface; and move the recording heads to return to the respective first tracks after accessing only the PTA map for the first track of the first disk surface.

17. The apparatus of claim 14, wherein the first tracks of the first and second disk surfaces are associated by a transfer function that characterizes relative track offsets of the respective first tracks at different skew angles.

18. The apparatus of claim 17, wherein the different skew angles comprise positive, zero, and negative skew angles.

19. The apparatus of claim 12, wherein the neighboring tracks comprise spare or last tracks of the first and second disk surfaces.

20. The apparatus of claim 12, wherein the neighboring tracks are spaced from the first tracks by a distance defined by (a size of a PTA guard band)+(a maximum PTA width/2)+(a predetermined number of tracks as a margin).

21. The apparatus of claim 12, wherein, after thermally actuating the leading head by the controller, the leading head is at an active fly height and the following head remains at the passive fly height.

22. The apparatus of claim 12, wherein:
the plurality of magnetic recording disk surfaces are configured for heat-assisted magnetic recording; and
the plurality of magnetic recording heads are configured for heat-assisted magnetic recording.

* * * * *